United States Patent [19]

Knepper et al.

[11] 3,956,008

[45] May 11, 1976

[54] LIQUID COLORANT DISPERSIONS FOR PLASTICS

[75] Inventors: Siegfried Knepper, Radevormwald, Germany; William M. Arnheim, III, Westfield; Lawrence John Grenner, Fair Lawn, both of N.J.

[73] Assignees: Kark Finke OHG, Wuppertal-Barmen, Germany; Inmont Corporation, New York, N.Y.; part interest to each

[22] Filed: Feb. 27, 1974

[21] Appl. No.: 446,457

[52] U.S. Cl. .................. 106/308 B; 106/308 Q; 106/308 F
[51] Int. Cl.$^2$............................................. C09C 3/08
[58] Field of Search.......... 106/308 Q, 308 F, 308 B

[56] References Cited
UNITED STATES PATENTS

| | | | |
|---|---|---|---|
| 2,113,539 | 4/1938 | Meister | 106/308 F |
| 2,589,306 | 3/1952 | Steiner | 106/22 |
| 2,942,997 | 6/1960 | Bram et al. | 106/308 F |
| 3,318,714 | 5/1967 | Coney et al. | 106/193 |
| 3,353,974 | 11/1967 | Trimble et al. | 106/32 |
| 3,656,982 | 4/1972 | Chapman et al. | 106/308 F |
| 3,767,444 | 10/1973 | Zeisberger | 106/308 Q |
| 3,804,656 | 4/1974 | Kaliski et al. | 106/308 Q |

*Primary Examiner*—Lorenzo B. Hayes

[57] ABSTRACT

Liquid colorant dispersions preferably comprising 5–70 weight percent colorant and 95–30% vehicle. The colorant is preferably a conventional pigment. The vehicle typically comprises two major components, (1) from 5 to 25 weight percent of a physically active, chemically inert solid in the form of fine particles (less than 90 microns in size), and, correspondingly, (2) from 95 to 75% of a surfactant system. It is often desirable to also include in the vehicle materials which serve as extenders and/or which modify vehicle properties such as rheology. Many times such materials are conventionally known as plasticizers although they do not function as such when used in the dispersions of this invention. The inert solid is preferably calcium carbonate. The preferred surfactant system is a sorbitan ester surfactant, such as sorbitan trioleate. The liquid colorant dispersions are used to color plastics by mixing them with the plastic, for example prior to the plasticizing stage of an injection molding or extrusion operation.

10 Claims, No Drawings

LIQUID COLORANT DISPERSIONS FOR PLASTICS

CROSS REFERENCE TO RELATED APPLICATIONS

This invention of this application deals with subject matter similar to that described in U.S. application Ser. No. 192,551, filed Oct. 26, 1971 by Siegfried Knepper for "Paste Vehicle and Color Paste Containing the Same."

BACKGROUND OF THE INVENTION

1. Field of the Invention

This application relates to the field of coloring plastics and particularly to liquid colorant compositions for use in coloring plastics.

2. Description of the Prior Art

It has been common industry practice to color thermoplastic resins during the processing steps, such as extrusion, injection or blow molding, and calendering, by using either color concentrates or so-called "dry color".

Color concentrates are dispersions of color pigment in a resin, usually the same resin as the clear resin the processor is using and usually in pellet form, at pigment concentrations of from about 10–60 %. The processor must either preblend the color concentrate pellets with the clear resin pellets or meter the color concentrate pellets into the clear resin pellet feedstream at from 0.5 to 10% by weight, in order to reduce the pigment concentration in the finished processed article to the desired level, usually from about 0.2 to 3.0%. Use of color concentrates has a number of disadvantages, two major ones being set forth in the paragraphs below.

If preblending is used this adds an additional processing step, with attendant cost, since the color concentrate pellets and clear resin pellets must be tumble-blended and delivered batch by batch to the processing equipment.

Metering of resin color concentrate pellets directly into the clear resin pellet feedstream at the bottom of feed hoppers of, for instance, extruders or injection molders, has also been practiced for some time. Because of color variation caused by variations in specific gravity, pellet size and flow characteristics of the color concentrate pellets through the metering equipment, the metering equipment needed has become more complicated and consequently more expensive. Even with this more expensive metering equipment, color uniformity during extended processing runs is still not entirely satisfactory using metered color concentrate.

It is usually not desirable and sometimes not possible to mix different types of thermoplastic resins. It has been necessary, therefore, for the resin processor to have a large color concentrate inventory — in essentially the same color for each of the various resins that he uses. For example, if the resin processor processes polyethylene, polystyrene and polypropylene and wants to make the same color red parts from each of these resins, it will probably be necessary for him to stock three different red color concentrates, one for each resin.

"Dry color" is the name conventionally given to color pigments treated or coated with dispersing aids, such as stearic acid. It is the conventional alternative to color concentrates. Dry color, also, can be added to clear resin by preblending with the color pellets or by metering into the clear pellet feedstream. Handling dry color is a dusty and dirty operation and the degree of dispersion of the color pigment in the finished processed article is not always satisfactory and it is difficult to achieve color uniformity in the parts produced.

As an alternative to color concentrates or dry color, resin processors sometimes use so-called precolored resin, supplied by the manufacturers of the resin. Precolored resin contains the desired amount of pigment already dispersed into the resin pellets so that articles made from it have the desired shade and color. However, precolored resin is sold at a substantial premium above clear resin prices and usually is available only for large quantity users.

With any of the above methods of coloring plastics changing the equipment from production of a part in one color to the same part in another color is time consuming, normally taking about an hour, and involves considerable waste plastic. The time consumed is important, since plastic processing machines are normally costed at $50 to $100 per hour of operating time.

Thus, coloring methods available to thermoplastic resin processors in the past have been inefficient, expensive or not completely satisfactory from the standpoint of achieving color uniformity.

Prior to those disclosed in the cross-referenced applications, liquid colorants were tried without much success. Some of these early liquid colorants "plated-out" on processing equipment parts such as the extruder screw, causing a build-up to the extent that the screw seized; some such colorants failed to give finished articles of uniform color, as evidenced by streaking or specking of the product; some proved incompatible with some resins, particularly polyolefins; some caused too great a loss of physical properties in the finished products; some of these liquid colorants settled-out, separated and stratified while being stored prior to use; and finally some products did not possess the proper rheological characteristics to permit precise metering.

The liquid colorant dispersions for plastics which are disclosed in the cross-referenced applications have overcome the disadvantages of the early liquid colorants. For example, they can be introduced by conventional metering devices, such as pumps, into the feed-screw area of an injection molder or extrusion machine. Such dispersions have consistently produced plastic products of uniform color, substantially free of specking and streaking. Also the liquid nature of these dispersions allows a plastic processor to eliminate a large inventory of various colored plastic resin pellets and stock only clear resin and relatively small amounts of liquid colorants.

Another advantage of these liquid colorant dispersions is that when the molder wishes to change the color of the product, the procedure is relatively simple. The simplest method involves disconnecting the feed hose to the pump, connecting a clean hose to the pump and immersing the other end of the clean hose in the new color. The new color will displace and push out the old color. The resin products will show some brief initial blending of the colors, but usually only four or five shots (in injection molding) or a few feet of plastic (in extrusion situations) need be scrapped before the new color appears fully.

The change from one color to another can be made in about 6–8 minutes, 10 minutes as a normal maximum, when using liquid colorants.

A liquid colorant dispersion, to be commercially acceptable, must have the following properties:

1. Stability — must not substantially settle or separate into layers after standing at the extremes of commonly encountered ambient storage conditions, such as −40° to 140°F, for at least 2 months.

2. Wetting Properties — at the recommended levels of use, must wet plastic pellets such that they do not clump or stick together.

3. Compatibility — must be compatible with common thermoplastic resins (styrenes, styrene-acrylonitriles, styrene-butadiene, acrylonitrile-butadiene-styrenes, olefins, vinyls, urethanes, etc.) such that plastic parts containing the dispersions can be post-processed in a conventional manner, such as by painting, printing, heat sealing, coating or glueing. If a liquid colorant dispersion were incompatible with the resin in which it was used, for example, the dispersion components might migrate to the surface of the plastic article and interfere with post-processing steps. Also, the liquid colorant dispersions must not substantially adversely affect physical properties of the plastic resins which they color.

4. Rheological Properties — must be such that dispersions can be conveniently introduced into plastic processing equipment by means of common pumping equipment. This requires that the absolute viscosity be in the range from about 300 to 35,000 centipoise, preferably 1,000–20,000; that the plastic viscosity be in the range from about 800 to 15,000 centipoise, preferably 1,000–10,000 centipoise, and that the yield be in the range from about 0.0 to 25 units, preferably 0.0–12 units. These values are obtained at 25°C by using a Brookfield Viscometer, model RVT, and using spindle No. 7 obtaining readings at 50RPM and 20RPM. A straight line is drawn through these two points and the x-axis intercept is taken as representing the yield value. The difference between the intercept and the 50RPM value is multiplied by the appropriate spindle factor and is taken as the plastic viscosity. The 50RPM reading is multiplied by the appropriate spindle factor to obtain absolute viscosity. This method of calculation is discussed in "Industrial Rheology and Rheological Structures," by Henry Green, John Wiley and Sons, Inc., New York, 1949, p.18. The pumping behavior of the dispersions of this invention correlate well with yield and plastic viscosity. Yield is a conventional measure of tendency of the material to flow smoothly without forming cavities within itself.

The qualifying term "substantially" is used at several points above. For example, must not "substantially" settle. In each case what is meant is "not beyond conventionally accepted commercial limits." For example, must not settle beyond conventionally accepted commercial limits which would be known to one skilled in the art.

Liquid colorant dispersions within the general scope of the above parameters are disclosed in the cross referenced application. Generally those therein disclosed comprise calcium carbonate particles and fatty acid esters, particularly those of sorbitan. That application also disclose that polyoxyethylene alkyl, or alkylaryl, ethers can be used to replace up to 80% of the fatty acid ester.

SUMMARY OF THE INVENTION

Applicants have now discovered improvements on the liquid colorant dispersions of the cross-referenced applications. Applicant's improved liquid colorant dispersions are within the above-described parameters and have the above-described advantages of liquid colorants. Applicants have developed these improvements by discovering:

1. that other fine particle inert solids can be used in place of, or in addition to, calcium carbonate, as long as they meet the above criteria of particle size and surface area.

2. that long-chain-polyoxyethylene-substituted sorbitan esters, when added to the dispersions of the above applications, produce plastic products having superior properties, particularly in polyolefins.

3. that esters of dicarboxylic acids such as di-2-ethyl hexyladipate, when added to the dispersions of the above application, yield liquid colorant dispersions capable of carrying greater amounts of pigment.

Broadly, applicants' liquid colorant dispersions comprise:

A. a physically active, chemically inert solid in the form of fine particles

B. a surfactant system.

C. a colorant

In order for the finished dispersions to have the above-described properties, the inert solid should have an average particle size of about 2.0–50 microns, preferably 5–20 microns. The particle size distribution should be such that 99% of the particles are 0.4 microns or over, preferably 0.5 microns or over; it should also be such that 99% of the particles are smaller than 120 microns, preferably smaller than 90 microns. The surface area of the particles should be such that the oil absorption of the material is in the range of 2.0 to 35.0 cc/100 grams and preferably between 5.0 and 20.0 cc/100 grams. Oil absorption is a conventional test for surface area, which is more fully described in ASTM test No. D1483-60/ The particles must remain discrete and not soften such as to stick together at common plastic processing temperatures, i.e., below 650°F.

To achieve the finished dispersion properties described above, the surfactant system should have a hydrophile-lipophile balance (a conventional measure of affinity for oil and water), commonly referred to as HLB, of about 1.5 or greater, preferably from about 8.0 to 11.0. Determination of HLB values is within the skill of those skilled in the art. An explanation of HLB values and their determination can be found in "The Atlas HLB System", 3rd Edition, (1963), a publication of Atlas Chemical Industries, Inc., Wilmington, Delaware, the text of which is incorporated herein by reference.

In order to result in dispersions which have good compatibility, the surfactant system used in this invention, and any other liquid materials combined therewith, such as the above-mentioned "plasticizers", preferably have a boiling point above 200°C. at 5 mm.Hg. Compatibility can also be enhanced by appropriate selecton of component materials from those having the other requisite properties set forth herein. Those skilled in the art will be aware of which of several possible component materials will be most compatible with the intended plastic resin. Also, the stability test mentioned above is an indication of compatibility.

The vehicle used in the dispersions of this invention comprises from about 5 to about 60 weight percent, preferably from about 5 to 25%, fine particle solids, with the balance being the surfactant system. When additional liquids such as "plasticizers" are used, the amount of the surfactant system is reduced accordingly. Typical ranges for "plasticizer"-containing vehicle are:

| | |
|---|---|
| fine particle solids | 5 to 50% |
| surfactant system | 10 to 95% |
| "plasticizer" | 0 to 85% |

"Plasticizers" are normally added when it is necessary to adjust the rheological properties of the dispersions.

Colorant is added to the vehicle of this invention to obtain the liquid colorant dispersions of this invention. The colorant used can be any conventional inorganic or organic pigment or carbon black. When inorganic colorants are used, the colorant dispersion normally comprises 40–70% colorant by weight, and a corresponding 60–30% vehicle. For organic colorants, the liquid colorant dispersion normally comprises 15–40% colorant; for carbon black 8–30% colorant, the balance in each case being vehicle. Thus the broad range of colorant which can be used with the vehicle to form these dispersions is 8–70%, based on the weight of the vehicle. Dyes can also be used, instead of pigments, within this broad range, and the term colorant is meant to include dyes. Also, it has been found that other conventional plastic additives can be substituted for all or part of the colorant. Typical such additives are blowing agents, antioxidants, slip agents, blocking agents, opacifiers, lubricants and U.V. stabilizers and flame retardants.

DESCRIPTION OF THE PREFERRED EMBODIMENTS

The preferred fine particle solids for use in this invention are silica and the sulfates, carbonates and silicates of the alkaline earth metals, particularly those of magnesium, calcium, strontium and barium. Calcium carbonate is particularly preferred.

Typical sorbitan esters useful in this invention are sorbitan monolaurate, -monooleate, -trioleate, -sesquioleate, -palmitate, -monostearate, -tristearate, and mixtures thereof.

Typical long-chain-polyoxyethylene-substituted sorbitan esters are polyoxyethylene (n) -sorbitan-monoleate, -monolaurate, -monostearate, -monopalmitate, -trioleate, -tristearate and -sesquioleate where (n), the polyoxyethylene chain length is between 4 and 40.

Applicants have found that inclusion in the surfactant system of esters of dicarboxylic acids, such as succinic through dodecanoic acid, with $C_1$–$C_{12}$ linear or branched alkyl alcohols, such as n-hexyl alcohol, n-octyl alcohol and 2 ethyl hexyl alcohol, results in higher pigment carrying capacity for the dispersions. Examples of such esters are di-2-ethylhexyl adipate and di-2-ethylhexyl azelate. These two examples are particularly useful since they have FDA clearances.

It may sometimes be desirable to add "plasticizers" in addition to, or as substitutes for, those named in the previous paragraph inn order to obtain the desired rheological properties. Typical of the "plasticizers" which can be used are those set forth on pages 234 and 235 of Volume 10 of the Encyclopedia of Polymer Science and Technology, Interscience Publishers (1969), the text of which is incorporated herein by reference.

The liquid colorant dispersions of this invention can be prepared by conventional liquid dispersion methods known to those skilled in the art.

The liquid colorant dispersions of this invention are added to the plastics to be colored in amounts up to about 15%, preferably up to 10%, based on the weight of the resin. The amount to be used is normally dependent on the color intensity desired. The dispersions are normally added to the clear resin at or adjacent to the base of the clear resin feed hopper and the beginning of the extrusion screw. Although the foregoing specification refers to pumping of the liquid colorant dispersions of this invention, the dispersions can also, if desired, be introduced into the plastic resin by other means, such as, for example, tumble-blending the resin and the dispersion together. Where a resin processor already has tumble-blending or other such equipment, he may prefer to use it instead of adding a pump. Although resin pellets are referred to in this specification, resin powders may also be used, particularly in the tumble-blending method described above. In such methods the percent of dispersion used can rise as high as 50% based on the total weight of the resin and dispersion mixture.

The resin, in whatever conventional form used — whether pellets or powder, can, of course, contain conventional resin additives such as fillers.

One useful way of testing whether a dispersion has the required wetting properties is the bag test. In this test about 400 grams of resin pellets are put in a clear plastic bag about the size of a small grocery bag with about 10 grams of liquid colorant dispersion. The bag is then closed, kneaded by hand a few times and then given 10 vigorous shakes by hand. Liquid colorant dispersions having the required wetting properties will uniformly coat the resin pellets and the inside of the bag and give the appearance of uniform color. Also, the pellets will appear dry and will flow freely over each other and not clump together when the bag is moved.

Typical examples of liquid colorant dispersions formulated in accordance with this invention are set forth in the following examples.

Example 1

| | Wt. % in Dispersion | Wt. % in Vehicle |
|---|---|---|
| TiO$_2$ | 65.0 | — |
| di-2-Ethylhexyladipate | 17.9 | 51.2 |
| Sorbitan Trioleate | 9.6 | 27.4 |
| Calcium Carbonate | 7.5 | 21.4 |
| | 100.0 | 100.0 |
| HLB = 8.5 | Absolute viscosity = 9,840 | |
| Plastic viscosity = 3,920 cps. | | |
| Yield = 7.4 | | |

Example 2

| | | |
|---|---|---|
| Carbon Black | 10.0 | — |
| di-2-Ethylhexyladipate | 12.0 | 13.3 |
| di-n-hexyl azelate | 12.0 | 13.3 |
| Sorbitan Trioleate | 15.2 | 16.9 |
| Polyoxyethylene(20) Sorbitan Monoleate | 40.8 | 45.4 |
| Calcium Carbonate | 10.0 | 11.1 |
| | 100.0 | 100.0 |
| HLB = 11.4 | Absolute viscosity = 11,080 | |
| Plastic viscosity = 2,840 | | |
| Yield = 10.3 | | |

Example 3

|  |  | Absolute viscosity = 3,680<br>Yield = 1.7 | Plastic viscosity = 2,320<br>HLB = 8.4 |
|---|---|---|---|
| Chrome Yellow |  | 40.0 | — |
| Sorbitan Monooleate |  | 30.0 | 50.0 |
| Polyoxyethylene (20) | Sorbitan Trioleate | 15.0 | 25.0 |
| Polyoxyethylene (20) | Sorbitan Monolaurate | 10.0 | 16.7 |
| Barium Sulfate |  | 5.0 | 8.3 |
|  |  | 100.0 | 100.0 |

Barium sulfate: average particle size 4.4 microns
99% greater than 0.5 microns
99% smaller than 44 microns
oil absorption 10.3 cc/100 g.

The HLB value of a vehicle is the net HLB value of the surfactant portion of that vehicle. The plasticizers which may be used in this invention do not have HLB values, as that term is defined in "Emulsions: Theory and Practice," Second Edition, American Chemical Society Monograph Series, by Paul Becker, Reinhold Publishing Corporation, New York 1965, page 233 et. seq., the text of which is incroporated herein by reference. As used herein the HLB value of a vehicle is thus considered to be the algebraic sum of the HLB values of the surfactants only. An example of calculation of the HLB value of the surfactant system portion of a vehicle is set forth below.

Example 4
LOW VISCOSITY DISPERSION
DYE AS COLORANT/PREFERRED HLB RANGE

|  | Component | HLB Value of Component | Wt. % In Dispersion | Wt. % In Vehicle |
|---|---|---|---|---|
| (A) | Calco oil Red ZMQ (American Cyanamid) | — | 40.0 | — |
| (B) | Sorbitan Trioleate | 1.8 | 9.9 | 16.5 |
| (C) | Polyoxyethylene (20) Sorbitan Trioleate | 11.0 | 26.5 | 44.2 |
| (D) | Dioctyladipate | — | 15.6 | 26.0 |
| (E) | Calcium Carbonate | — | 8.0 | 13.3 |
|  |  |  | 100.0 | 100.0 |

$$HLB = \frac{1.8 \times B + 11.0 \times C}{B+C} = \frac{1.8 \times 0.099 + 11 \times 0.265}{0.099 + 0.0265}$$

$$= \frac{0.178 + 2.915}{0.364} = \frac{3.093}{0.364} = 8.5$$

Absolute viscosity = 2,480 cps
Plastic viscosity = 1,440 cps
Yield = 1.3

Calcium Carbonate:
average particle size 14
99% less than 50 microns
99% greater than 2.5 microns
oil absorption 11.0 cc/100 g.

Example 6
LOW PIGMENT LOADING/SHORT CHAIN POLYOXYETHYLENE
LOW CaCo₃ PERCENT

|  | Wt. Percent in Vehicle | Wt. Percent in Dispersion |
|---|---|---|
| Carbon Black | — | 8.0 |
| Sorbitan Trioleate | 24.2 | 22.3 |
| Polyoxyethylene (4) Sorbitan mono laurate | 40.4 | 37.2 |
| Dioctyl Azelate | 27.8 | 25.5 |
| Calcium Carbonate | 7.6 | 7.0 |
|  | 100.0 | 100.0 |

HLB = .375×1.8+.625×13.3 = 8.99
Absolute viscosity = 8,800
Plastic viscosity = 2,400

Example 5
HI PIGMENT LOADING/ LOW HLB

|  | Wt. % in Dispersion | Wt. % in Vehicle |
|---|---|---|
| TiO₂ | 70.0 | — |
| Sorbitan Trioleate | 8.8 | 29.3 |
| Dioctyl Adipate | 8.1 | 27.0 |
| Dioctyl Azelate | 8.1 | 27.0 |
| Calcium Carbonate | 5.0 | 16.7 |
|  | 100.0% | 100.0 |

HLB = 1.0 × 1.8 = 1.8
Absolute viscosity = 10,880
Plastic viscosity = 3,680
Yield = 9.0

Yield = 8.0

Example 7
HIGH HLB/HIGH VISCOSITY/PLASTICIZER

|  | Wt. % in Dispersion | Wt. % in Vehicle |
|---|---|---|
| TiO₂ | 59.9 | — |
| Sorbitan Monoleate | 3.7 | 9.2 |
| Polyoxyethylene (20) sorbitan monolaurate | 17.0 | 42.5 |
| Trioctyl phosphate | 10.2 | 25.4 |
| CaCO₃ | 9.2 | 22.9 |
|  | 100.0 | 100.0 |

HLB = 14.5
Absolute viscosity = 14,080
Plastic viscosity = 11,440
Yield = 3.3

EXAMPLE 8
DYE AS COLORANT
LOW VISCOSITY/HIGH IN FINE PARTICLE SOLIDS

|  | Wt. % in Dispersion | Wt. % in Vehicle |
|---|---|---|
| Sudan Irisol | 17.6 |  |
| Sorbitan Trioleate | 7.0 | 8.5 |
| Polyoxyethylene (20) sorbitan trioleate | 18.9 | 22.9 |
| Dioctyl adipate | 11.1 | 13.5 |
| Calcium Carbonate | 45.4 | 55.1 |
|  | 100.0 | 100.1 |

HLB = 8.5
Absolute viscosity = 2,000 cps.
Plastic viscosity = 1,760 cps.
Yield = 0.3

Calcium carbonate: average particle size 14 microns 99% less than 50 microns 99% greater than 2.5 microns oil absorption 11.0 cc/100 g.

Example 9
HIGH PLASTICIZER CONTENT

|  | Wt. % in Dispersion | Wt. % in Vehicle |
|---|---|---|
| TiO$_2$ | 69.0 | — |
| Sorbitan Trioleate | 4.3 | 13.9 |
| Dioctyl Adipate | 25.1 | 81.0 |
| CaCO$_3$ | 1.6 | 5.1 |
|  | 100.0 | 100.0 |

HLB Value = 1.8
Absolute viscosity = 4,320 cps.
Plastic viscosity = 1,760 cps.
Yield = 3.2

Example 10
HIGH VISCOSITY

|  | Wt. % in Dispersion | Wt. % in Vehicle |
|---|---|---|
| TiO$_2$ | 67.0 | — |
| Sorbitan Monoleate | 24.4 | 73.9 |
| Dioctyl Adipate | 6.2 | 18.8 |
| CaCO$_3$ | 2.4 | 7.3 |
|  | 100.0 | 100.0 |

HLB = 4.3
Absolute viscosity = 31,280
Plastic viscosity = 14,640
Yield = 20.8

Example 11
BARIUM SULFATE SOLIDS

|  | Wt. % in Dispersion | Wt. % in Vehicle |
|---|---|---|
| PCN Blue | 20.0 | — |
| Sorbitan Monolaurate | 24.5 | 30.6 |
| Dioctyl Azelate | 45.5 | 56.9 |
| Ba SO$_4$ | 10.0 | 12.5 |
|  | 100.0 | 100.0 |

Barium sulfate average particle size 4.4 microns

-continued
Example 11
BARIUM SULFATE SOLIDS

|  | Wt. % in Dispersion | Wt. % in Vehicle |
|---|---|---|
| 99% greater than 0.5 microns 99% smaller than 44% microns oil absorption 10.3 cc/100 g. | | |

Example 12
SILICA SOLIDS AND PLASTICIZER

|  | Wt. % in Dispersion | Wt. % in Vehicle |
|---|---|---|
| TiO$_2$ | 60 | — |
| Sorbitan Trioleate | 7 | 17.5 |
| Polyoxyethylene (20) Sorbitan Trioleate | 15 | 37.5 |
| Dimethyl phthalate | 8 | 20.0 |
| Silica | 10 | 25.0 |
|  | 100 | 100.0 |

HLB = 8.1
Absolute viscosity = 15,360
Plastic viscosity = 6,720
Yield = 10.8

Silica average particle size 4.2 microns
oil absorption 18 cc/100 g.

Example 13
MAGNESIUM SILICATE SOLIDS AND PLASTICIZER

|  | Wt. % in Dispersion | Wt. % in Vehicle |
|---|---|---|
| TiO$_2$ | 65.0 | — |
| Sorbitan Trioleate | 5.7 | 16.3 |
| Polyoxyethylene (20) Sorbitan Trioleate | 15.3 | 43.7 |
| Tricresyl Phosphate | 9.0 | 25.7 |
| Mg SiO$_2$ | 5.0 | 14.3 |
|  | 100.0 | 100.0 |

HLB = 8.5
Absolute viscosity = 13,920
Plastic viscosity = 6,880
Yield = 8.8

Example 14
SILICA SOLIDS AND PLASTICIZER

|  | Wt. % in Dispersion | Wt. % in Vehicle |
|---|---|---|
| TiO$_2$ | 65.0 | — |
| Sorbitan Trioleate | 5.7 | 16.3 |
| Polyoxyethylene (20) Sorbitan Trioleate | 15.3 | 43.7 |
| Tricresyl Phosphate | 9.0 | 25.7 |
| SiO$_2$ | 5.0 | 14.3 |
|  | 100.0 | 100.0 |

HLB = 8.5
Absolute viscosity = 14,240
Plastic viscosity = 7,600
Yield = 8.3
Silica average particle size 2.1 microns
Oil Absorption 25.2 cc/100 g.

Example 15
PLASTIC ADDITIVE/PREFERRED RANGE
HLB/PREFERRED VISCOSITY RANGE

| Liquid Blowing Agent Dispersion | Wt. % in Dispersion | Wt. % in Vehicle |
|---|---|---|
| (A) Celogen AZ-130 (an azodicarbonamide blowing agent marketed by Naugatuck Chemicals) | 43.3 | |
| (B) Dioctyl Adipate | 14.8 | 26.1 |
| (C) Sorbitan Trioleate | 9.3 | 16.4 |
| (D) Polyoxyethylene (20) Sorbitan trioleate | 25.1 | 44.3 |
| (E) Calcium Carbonate | 7.5 | 13.2 |
|  | 100.0 | 100.0 |

HLB Value of Vehicle = .27 × 1.8 + .73 × 11.0 = 8.52

Example 15
PLASTIC ADDITIVE/PREFERRED RANGE
HLB/PREFERRED VISCOSITY RANGE

| Liquid Blowing Agent Dispersion | Wt. % in Dispersion | Wt. % in Vehicle |
|---|---|---|

-continued

Absolute viscosity = 9,600 cps.
Plastic viscosity = 4,000 cps.
Yield value = 7
Avg. part. size of (E) = 5 microns
Avg. part. size distribution The above dispersion has been successfuly used to manufacture foamed plastic furniture parts from plastics such as polystyrene.

The dispersion of example 1 was introduced into the throat of a Lombard 75 ton 3oz. injection molder during the "plasticizing" portion of the cycle by means of a "Colormatic" pump (Foremost Machine Builders, model p-1). The dispersion of example 1 was used in an amount of 2% of the plastic employed (Polypropylene 5520, Shell Chemical Co.) and molded into plaques 5⅞ × 3⅞ × ⅛ inch. The resultant plaques were free of specks and streaks and uniform in color. Similar operations, on either laboratory or commercial scale or both, have been successfully carried out with the dispersions of the foregoing examples, with numerous different types of plastics and various different dispersion percentages within the scope of the foregoing specification.

In the above examples all parts are by weight. Many of the examples illustrate extremes of the ranges, or other features of interest, set forth in the specification and claims. As an aid to understanding of the application, particular features illustrated by a given example are mentioned in the caption of that example.

Unless otherwise specifically set forth in the examples using calcium carbonate, the calcium carbonate used had the following characteristics:

| | |
|---|---|
| Average particle size | 5 microns |
| 99% smaller than | 14 microns |
| 99% larger than | 0.7 microns |
| Oil absorption | 10.3 cc/100 g. |

We claim:

1. A liquid colorant dispersion for coloring plastics comprising a colorant and a vehicle, the vehicle comprising:
   1. a physically active, chemically inert inorganic fine particle solid having a particle size between about 2 and about 50 microns, wherein 99% of the particles are over 0.4 microns in diameter and 99% are under 120 microns, and wherein the surface area as indicated by oil absorption is between 2 and 35 cc/100 grams, said fine particle solid being selected from the group consisting of silica and the carbonates, sulfates and silicates of the alkaline earth metals,
   2. a surfactant system having an HLB greater than about 1.5 and comprising at least one sorbitan ester selected from the group consisting of sorbitan-monolaurate, -monoleate, -trioleate, -sesquioleate, -palmitate, -monostearate, -tristearate, and mixtures thereof, and at least one polyoxyethylene-substituted sorbitan ester wherein the polyoxyethylene chain length ranges from 4 to 40;

and wherein:
   a. the dispersion is stable for at least two months at temperatures between about -40°F and 140°F,
   b. the vehicle contains component (1) from about 5 to about 60 percent, and component (2) from about 95 to about 40 percent,
   c. the surfactant system has a boiling point above about 200°C at 5 mm. Hg. and
   d. the dispersion has a viscosity between about 300–35,000 centipoise, a plastic viscosity between about 800 and 15,000 centipoise and a yield of about 0.0–25 units.

2. The liquid colorant dispersion of claim 1 wherein: the dispersion vehicle contains component (1) from about 5 to about 25 percent and component (2) from about 95 to about 75 percent; the dispersion contains colorant from about 8 to about 70 percent based on the total weight of the dispersion; the surfactant system has an HLB between about 8.0 and 11.0; and component (1) has a particle size between about 5–20 microns, with 99% greater than 0.5 microns and less than 90 microns, and has an oil absorption between about 5–20 cc/100 grams.

3. The liquid colorant dispersion of claim 2 wherein the surfactant system additionally comprises an ester of $C_4$–$C_{12}$ dicarboxylic acid with a $C_1$–$C_{12}$ linear or branched alkyl alcohol.

4. The liquid colorant dispersion of claim 1 wherein the surfactant system additionally comprises at least one plasticizer.

5. The liquid colorant dispersion of claim 2 wherein said dispersion has a viscosity between about 1,000–20,000 centipoise, a plastic viscosity between about 1,000–10,000 centipoise and a yield from 0–12 units.

6. The liquid colorant dispersion of claim 2 wherein the fine particle solid is calcium carbonate.

7. The liquid colorant dispersion of claim 1 wherein the colorant is partially or wholly replaced by a blowing agent.

8. The liquid colorant dispersion of claim 2 wherein the sorbitan ester is sorbitan trioleate and the dicarboxylic acid ester is di-2-ethylhexyl adipate.

9. The liquid colorant dispersion of claim 2 wherein the sorbitan ester is sorbitan trioleate and the dicarboxylic acid ester is di-2-ethylhexyl azelate.

10. The liquid colorant dispersion of claim 2 wherein the polyoxyethylene-substituted sorbitan ester is polyoxyethylene (20) sorbitan trioleate, the sorbitan ester is sorbitan trioleate and the surfactant system additionally comprises di-2-ethylhexyl adipate.

* * * * *